United States Patent [19]
Von Sacken et al.

[11] Patent Number: 5,747,188
[45] Date of Patent: May 5, 1998

[54] BATTERY WITH IMPROVED SAFETY DURING MECHANICAL ABUSE

[75] Inventors: Ulrich Von Sacken, Coquitlam; Wendy Chow, Burnaby; Allen Shkuratoff, North Vancouver, all of Canada

[73] Assignee: Moli Energy (1990) Limited, Canada

[21] Appl. No.: 838,179

[22] Filed: Apr. 16, 1997

Related U.S. Application Data

[63] Continuation of Ser. No. 451,019, May 25, 1995, abandoned.

[30] Foreign Application Priority Data

Aug. 5, 1994 [CA] Canada ................................ 2129558

[51] Int. Cl.$^6$ .................................................. H01M 10/02
[52] U.S. Cl. .............................. 429/61; 429/94; 429/197; 429/218
[58] Field of Search .......................... 429/61, 94, 197, 429/218, 57, 90

[56] References Cited

U.S. PATENT DOCUMENTS 5,464,705  11/1995  Wright ........................................ 429/61

OTHER PUBLICATIONS

K. Ozawa, et al., "Cycle Performance of Lithium Ion Rechargeable Battery," 10th International Seminar on Primary and Secondary Battery Technology and Application, Mar. 1–4, 1993, Deerfield Beach, Florida.

*Primary Examiner*—John S. Maples
*Attorney, Agent, or Firm*—Lerner, David, Littenberg, Krumholz & Mentlik

[57] ABSTRACT

A battery construction is disclosed having improved safety behaviour under conditions of mechanical abuse, in particular crush type abuse, wherein an additional site for internal short circuiting is engineered therein. In certain circumstances, it can be beneficial to initiate the engineered short before other internal shorts occur. Additionally, it may be beneficial for the engineered short to have a lower resistance than the internal resistance of the battery. The invention is particularly suited for application in lithium ion type batteries.

29 Claims, 4 Drawing Sheets

BATTERY WITH IMPROVED SAFETY DURING MECHANICAL ABUSE

This is a continuation of application Ser. No. 08/451,019, filed May 25, 1995, now abandoned.

FIELD OF THE INVENTION

The invention pertains to the field of batteries and to battery behaviour under abusive situations. In particular, the invention pertains to batteries that undergo mechanical abuse.

BACKGROUND OF THE INVENTION

The demand for batteries has been increasing significantly of late for a variety of applications. These include applications having moderate energy storage requirements as in consumer electronics devices (eg: camcorders and cellular phones), as well as applications having large energy storage requirements as in electric vehicles or load-levelling systems. As battery technology adapts to these requirements, improvements result in more energy being stored in smaller volumes, often with an associated increase in deliverable power. While these improvements to the technology result in batteries with better performance, there exists the potential for greater safety risks.

It is essential that consumer products behave in a predictable, completely safe manner when used as intended. However, it is also essential that consumer products behave in a predictable, relatively safe manner even when misused or abused to a certain extent. Abusive situations can often be classified as being one of the following types: electrical, thermal, or mechanical abuse.

Electrical abuse comprises situations involving overdischarge, overcharge, or short circuit conditions. Thermal abuse comprises situations involving external application of heat (eg: exposure to an oven, flame, or to spot heating). Mechanical abuse comprises situations involving shock, nail or bullet penetration, crushing, and the like.

Generally speaking, in applications having moderate energy storage requirements, batteries are expected neither to present serious risk of injury to the user nor to property under electrical abuse situations. However, a greater tolerance is given under thermal and/or mechanical abuse situations. Fire may be considered acceptable, for example, as a result of such abuse, although explosions resulting in shrapnel are not. The larger the battery gets however, the greater the hazard becomes under abuse. While the tolerance is somewhat relaxed for applications having large energy storage requirements (eg: large Pb acid batteries are commercially accepted even though they can cause serious injury or damage when short circuited), there are limits to this tolerance (eg: large lithium batteries are not currently available for consumer use in part due to safety concerns).

Therefore, it is desirable to improve battery safety in general under abusive situations both for lessening the risks in existing applications but also for enabling the use of some battery systems for other applications. One desired improvement is with respect to a particular type of mechanical abuse involving the application of non-uniform external pressure to the battery container thereby deforming the container. This can happen in a number of ways in the field but is generally simulated in the industry by crushing test batteries between a round bar and a flat plate to a fixed proportion of their original dimensions. This simulation is known as the crush test.

Usually, the results of a crush test include a breaching of the battery container, with a corresponding exposure of the battery contents to the environment, and the generation of a short circuit internal to the battery when the electrodes of opposite polarity are deformed so as to contact one another. The energy of the battery is then dissipated internally through the internal short circuit, resulting in what can be severe local heating coupled with an overall increase in battery temperature. Thus, such a test actually can be equivalent to thermal abuse depending on the battery type tested. (Note that batteries with high internal impedance may not generate significant heat in practice in such a situation.) In fact, the crush test can constitute quite a severe thermal abuse test since it can effectively combine internal spot heating abuse with a short circuit test.

Many developmental and commercial battery systems may show acceptable behaviour to external short circuit conditions yet not behave acceptably under internal short circuit conditions. For example, some consumer lithium primary batteries can catch fire when shorted internally but not when shorted externally, such as those referred to in the Duracell™ product recall ("Duracell Product Recall", The Times (London, England) Fiday, Jul. 7, 1989). Also for example, a discontinued line of rechargeable lithium battery products, the Molicel® B06 battery, showed similar behaviour. In the latter example, external short circuit conditions lead to a more or less uniform heating of the battery which eventually melted and sealed the battery separator before the battery temperature reached a critical level. The sealed separator prevented further discharge and power dissipation and hence further heating. However, the local heating at the site or sites of internal short circuits could still be sufficient to exceed a critical temperature level thereby initiating a runaway reaction and causing a fire.

Thus, while certain battery systems may be capable of withstanding uniform heating due to an external short circuit condition in an acceptable manner, they may not survive an internal shorting condition which produces non-uniform localized internal heating. It is thus clearly desirable to improve on the behaviour as a result of internal short circuits in lithium type batteries in particular. An example of a recent product that has relatively high rate capability and high energy density and that shows good characteristics in the crush test is the Sony Energy Tec™ lithium ion product mentioned in K. Ozawa et al., The Tenth International Seminar On Primary And Secondary Battery Technology And Application, Mar. 1–4, 1993, Deerfield Beach, Fla. The results of a crush test are typically of a statistical nature as is shown in the aforementioned reference, in other words behaviour is given in terms of a probability of occurrence.

Lithium-ion or rocking chair type batteries represent the state of the art in rechargeable power sources for commercial electronics applications. Typically, these batteries have about twice the energy density (Wh/L) of conventional rechargeable systems (such as NiCd or lead acid batteries). Additionally, lithium ion batteries operate at about 3½ volts so that a single cell can suffice for many electronics applications. The aforementioned Sony product is a 3.6 V lithium ion battery containing $LiCoO_2$ and pre-graphitic carbon as the active materials in the positive and negative electrodes respectively. These batteries have achieved over a thousand charge-discharge cycles without significant capacity loss and with an actual slight improvement in safety under abusive conditions.

SUMMARY OF THE INVENTION

A battery having improved safety behaviour under conditions of mechanical abuse, in particular crush type abuse, represents one aspect of the invention. The battery has an internal resistance and has a construction comprising a container and an active electrode assembly comprising a cathode electrode and an anode electrode inside the container. Upon application of increasing non-uniform pressure to said container, an intrinsic internal short is eventually created in an intrinsic shorting region or regions, the net resistance of which decreases as said applied non-uniform pressure increases. Improved safety behaviour is achieved according to the invention by incorporating additional or extrinsic internal shorting means inside the container and involving at most one electrode of the active electrode assembly comprising extrinsic shorting region or regions. Said extrinsic internal shorting means is geometrically configured with respect to the container and to the electrode assembly such that an extrinsic internal short is created in the extrinsic shorting region or regions upon application of the increasing non-uniform pressure.

The extrinsic internal short can be created before the net resistance of the intrinsic internal short equals the internal resistance of the battery. It can be preferable for the extrinsic internal short to be created before the intrinsic internal short is created within the active electrode assembly. Furthermore, it can be preferable for the resistance of the extrinsic internal short to be less than the internal resistance of the battery before the intrinsic short is ever created.

The internal shorting means can comprise a core central to the active electrode assembly wherein the core further comprises puncturing means. The puncturing means can comprise a screw thread on the outer surface of said core. Alternatively, the puncturing means can comprise at least one concentric thread on the outer surface of said core. The core can be at one battery potential and be adjacent to a central separator section wherein the central separator section is in turn adjacent to an electrode at the opposite battery potential.

Alternatively, the internal shorting means can be peripheral to the active electrode assembly and can further comprise puncturing means. The puncturing means in this case can comprise a section of expanded metal located between the container at one battery potential and an outer separator section wherein the outer separator section is adjacent to an electrode at the opposite battery potential.

The internal shorting means need not comprise puncturing means and can instead comprise an outer separator section located between the container at one battery potential and an electrode at the opposite battery potential wherein the outer separator section further comprises a plurality of macroscopic holes.

Batteries of the invention can be cylindrically shaped. Also, batteries of the invention can comprise a lithium transition metal oxide cathode, an electrolyte comprising a lithium salt dissolved in non-aqueous solvents, and a carbonaceous anode. In particular, said batteries can comprise a lithium cobalt oxide cathode, an electrolyte comprising lithium hexafluorophosphate dissolved in a mixture of propylene carbonate, ethylene carbonate, and diethyl carbonate solvents, and a graphitized carbonaceous anode.

The crush type abuse condition referred to previously can be of a kind wherein the non-uniform pressure applied results from crushing the battery with a round bar.

The invention further encompasses a method of making a battery more benign to mechanical abuse. Said method comprises the following steps:

preparing the battery for assembly wherein the battery after assembly has an internal resistance and a construction comprising a container, an active electrode assembly comprising a cathode electrode and an anode electrode, inside the container, the assembly comprising intrinsic shorting region or regions wherein an intrinsic internal short is created in the intrinsic shorting region or regions upon application of increasing non-uniform pressure to said container, the net resistance of the first internal short decreasing as said applied non-uniform pressure is increased; installing extrinsic internal shorting means inside the container and involving at most one electrode of the active electrode assembly, the internal shorting means comprising extrinsic shorting region or regions and additionally being geometrically configured with respect to the container and to the electrode assembly such that an extrinsic internal short is created in the extrinsic shorting region or regions upon application of the increasing non-uniform pressure; and finally assembling the battery.

In the method of the invention, the extrinsic internal short can be created before the net resistance of the intrinsic internal short equals the internal resistance of the battery. It can be advantageous for the installation to be such that the extrinsic internal short is created before the intrinsic internal short. Additionally, it can be advantageous for the installation to be such that the extrinsic internal short resistance is less than the internal resistance of the battery before the intrinsic internal short is created.

The installation step of the method can comprise placing a core central to the active electrode assembly and providing said core with puncturing means. Furthermore, the installation step can comprise connecting the core to one battery potential and placing said core adjacent to a central separator section wherein the central separator section in turn is adjacent to an electrode at the opposite battery potential.

Alternatively, the installation step of the method can comprise locating the internal shorting means peripheral to the active electrode assembly. The installation step can further comprise providing said internal shorting means with puncturing means.

Alternatively, the installation step of the method can comprise locating an outer separator section between the container at one battery potential and an electrode at the opposite battery potential wherein the outer separator section comprises a plurality of macroscopic holes.

The method applies to batteries that are cylindrically shaped. Also, the method applies to batteries comprising a lithium transition metal oxide cathode, an electrolyte comprising a lithium salt dissolved in non-aqueous solvents, and a carbonaceous anode. In particular, the method applies to batteries comprising a lithium cobalt oxide cathode, an electrolyte comprising lithium hexafluorophosphate dissolved in a mixture of propylene carbonate, ethylene carbonate, and diethyl carbonate solvents, and a graphitized carbonaceous anode.

The method of the invention applies to batteries that may be subjected to crush type abuse wherein the non-uniform pressure results from crushing the battery with a round bar.

BRIEF DESCRIPTION OF THE DRAWINGS

In drawings which illustrate specific embodiments of the invention, but which should not be construed as restricting the spirit or scope of the invention in any way.

DETAILED DESCRIPTION OF THE SPECIFIC EMBODIMENTS OF THE INVENTION

For a particular battery electrochemistry and basic design, there generally exists inherent an intrinsic region or regions wherein internal shorting occurs upon application of sufficient non-uniform pressure to the container. These regions can be in the active electrode assembly (which includes both the anode electrode and the cathode electrode) itself, in which case the battery can discharge at high rate locally through the intrinsic short within the active electrode assembly. This, in turn, can lead to significant localized heating of the active electrode assembly.

The instant invention involves the provision of an extrinsic (additional) region in the battery wherein an extrinsic internal short occurs outside the active electrode assembly, that is, inside the container and involving at most one electrode of the active electrode assembly, in combination with the original intrinsic internal short. In principle, the greatest power dissipation occurs at a single shorting site when the electrical resistance of the short matches the internal resistance of the battery itself. Under this condition, impedance matching is said to occur. (Impedance refers to the total effective resistance of an electric circuit to alternating current. Herein, ohmic resistance only and not reactance are considered. In electrochemical situations, this corresponds to behaviour under direct current (DC) or very low frequency situations.) The power P dissipated in a single shorted site having resistance R for a battery having internal resistance r and voltage V is given by:

$$P = \frac{V^2 (R/r)}{r(1 + R/r)^2}$$

As a battery is subjected to increasing application of non-uniform pressure, typically an intrinsic internal short will be created at some point in said intrinsic region or regions and the resistance of this intrinsic internal short will continue to decrease as the pressure increases. Additionally, shorting may develop at other sites in the intrinsic region or regions as the pressure increases. Eventually, the resistance of the internal short may decrease such that impedance matching occurs. In the worst case, the internal shorting occurs at a single site whereupon the power dissipated in the single site is given by the preceding equation when r=R. The provision of an extrinsic region outside the active electrode assembly wherein an extrinsic internal short occurs prior to impedance matching prevents maximum power dissipation from occurring in the intrinsic region or regions alone. Thus the maximum local heating in any single region is reduced. Additionally since the extrinsic internal short occurs outside the active electrode assembly, energy can be dissipated in a region that may be less sensitive chemically to heat generation and hence less prone to a runaway reaction.

The requirement of the invention that the extrinsic internal short be created in combination with the intrinsic internal short necessitates configuring the extrinsic internal shorting means geometrically with respect to the battery container and to the electrode assembly such that this occurs during application of the non-uniform pressure.

In embodiments wherein the extrinsic region or regions is less sensitive to heat generation, it is preferable that the extrinsic internal short be created before the intrinsic internal short is created within the active electrode assembly. Then, the energy is initially dissipated in a less sensitive region.

Furthermore, if maximum power can be dissipated in the extrinsic region or regions (ie. when impedance matching occurs) with acceptable resulting safety behaviour, it can be preferable that the resistance of the extrinsic internal short be less than the internal resistance of the battery before the intrinsic short is ever created. Then, the total power dissipated in local regions in the battery must be decreasing (since the point of impedance matching has been passed) before the intrinsic short is created.

Additionally, the more likely that the extrinsic internal short, after creation, reaches a resistance lower than the internal resistance of the battery, the less probable impedance matching can occur under any circumstances (ie. as a result of matching the internal resistance of the battery to that of the extrinsic internal short resistance by itself or in combination with the intrinsic internal short resistance). In other words, creating an internal short with very low resistance can be expected to improve battery safety. Theoretically, a battery with a zero resistance internal short is expected to behave exactly like a battery subjected to a zero resistance external short. In each case, the energy of the battery is dissipated as quickly as possible with relatively uniform heating of the battery occurring. No internal local heating would occur due to a zero resistance short. Thus, as long as the battery is safe when shorted externally, incorporating means of generating internal shorts with very low resistance can actually improve safety in this regard.

Embodiments of the battery of the invention can be of various sizes, designs, and electrochemistries. Often, the active electrode assemblies define a volume having a non-active central region as well as a peripheral surface. Thus, the internal shorting means provided by the invention can be located in said central region or outside said peripheral surface. Ideally, the internal shorting means operates effectively over the entire central region and/or peripheral surface, otherwise it may not function for many variations of an applied non-uniform pressure.

Figure 1:
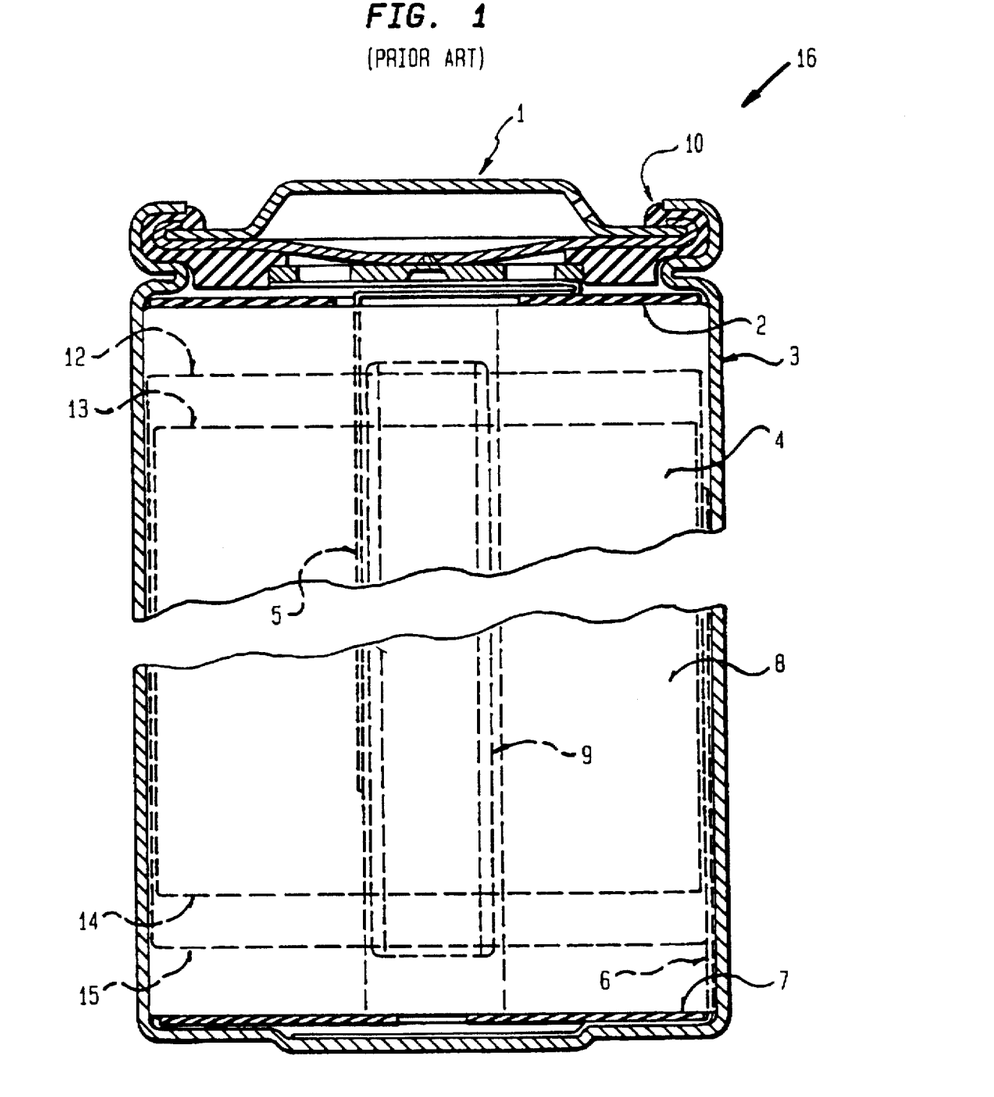
FIG. 1 depicts a cross-sectional view of a spiral-wound lithium ion type battery of conventional construction.

A preferred embodiment comprises a lithium ion type system as depicted in the conventional spiral-wound type battery shown in the cross-sectional view of FIG. 1. In such a battery a jelly roll electrode assembly 4 is created by spirally winding a cathode foil (not shown), an anode foil (not shown), and two microporous polyolefin sheets (not shown) that act as separators.

Cathode foils are prepared by applying a mixture of a suitable cathode material, such as a lithiated transition metal oxide, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered carbonaceous compound is used instead of the cathode material and thin copper foil is usually used instead of aluminum. Anode foils are typically slightly wider than the cathode foils in order to ensure that anode foil is always opposite cathode foil. This feature is illustrated with the cathode upper edge 13, cathode lower edge 14, anode upper edge 12, and anode lower edge 15 depicted in FIG. 1.

The jelly roll 4 is inserted into a conventional battery container 3. A header 1 and gasket 10 are used to seal the battery 16. The header may include safety devices if desired. A combination safety vent and pressure operated disconnect device may be employed. FIG. 1 shows one such combination that is described in detail in Canadian Patent Application No. 2,099,657, filed Jun. 25, 1993, assigned to Moli Energy (1990) Limited. Additionally, a positive thermal coefficient device (PTC) may be incorporated into the header (not shown) to limit the short circuit current capability of the battery. The external surface of the header 1 is used as the positive terminal, while the external surface of the container 3 serves as the negative terminal.

Appropriate cathode tab 5 and anode tab 6 connections are made to connect the internal electrodes to the external terminals. Appropriate insulating pieces 2 and 7 may be inserted to prevent the possibility of internal shorting. Additionally, a core 9 may be inserted to prevent an unwinding of the jelly roll 4 into its vacant internal region and/or to stiffen the battery internally. Prior to crimping the header 1 to the container 3 in order to seal the battery, liquid electrolyte 8 is added to fill the porous spaces in the jelly roll 4.

Figure 2:
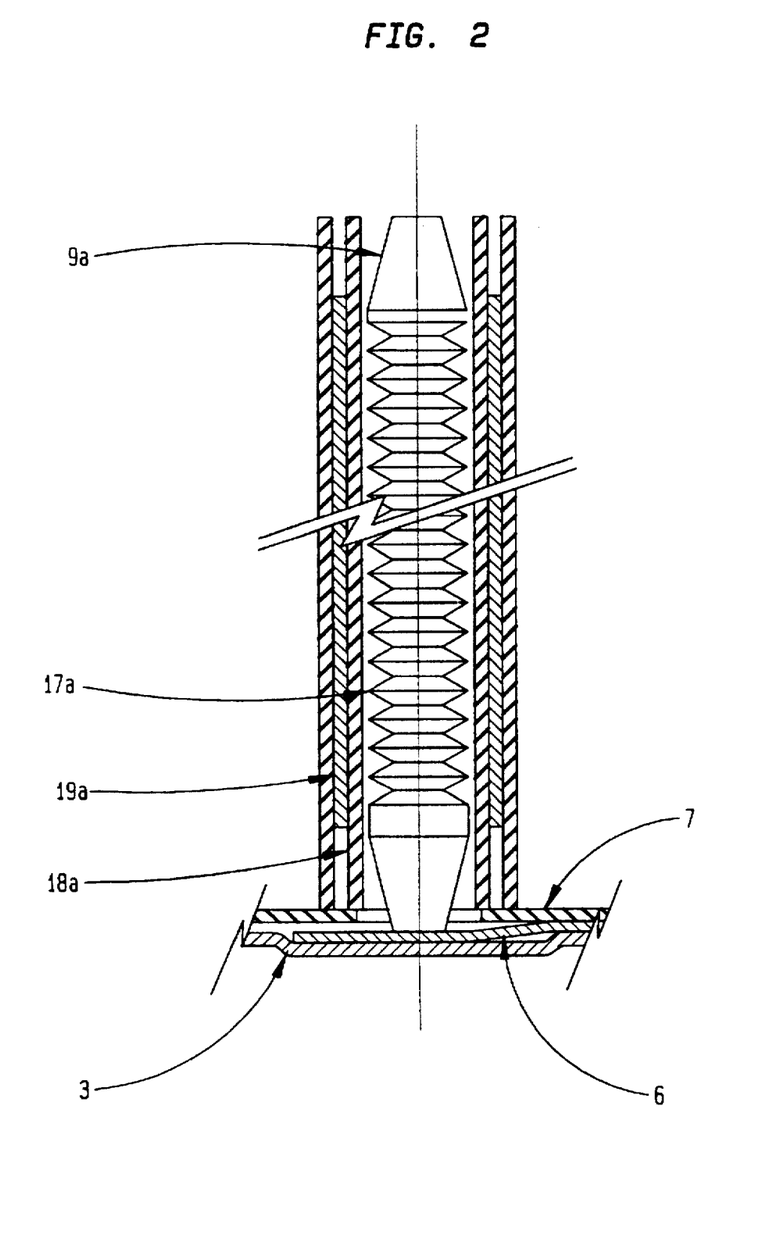
FIG. 2 depicts a possible construction comprising a concentric thread core that, when incorporated in the battery of FIG. 1, results in an embodiment of the invention.

To provide internal shorting means according to the invention, a construction similar to that depicted in FIG. 2 can be incorporated in the battery of FIG. 1. In FIG. 2, the conductive core 9a has a plurality of concentric threads 17a defined on the outer surface thereof. Core 9a is used instead of core 9 in FIG. 1. The core 9a is electrically connected via spot weld (not shown) to tab 6 which is in turn connected to the battery container 3. (The container 3 in this embodiment is at anode potential.) The core 9a is adjacent to a central separator wrap 18a which in turn is adjacent to the inner cathode 19a (which normally comprises active cathode material coated on a metal foil collector, as discussed above). The surface of the cathode 19a in this central region is not coated with active cathode material to lessen the sensitivity of the region to heating but also to allow a lower resistance contact to be made directly to the cathode there.

When sufficient non-uniform pressure is applied over virtually any part of the cylindrical surface of the battery comprising the construction of FIG. 2, the concentric threads 17a puncture the central separator wrap 18a and come into contact with the surface of the cathode 19a thereby creating a short. The amount of deformation required and the resistance of the extrinsic internal short that results will vary with the choice and thickness of the central separator wrap 18a materials along with the shape of the concentric threads 17a. Suitable choices can be determined empirically.

Those skilled in the art will understand that the types of and amounts of the component materials in the basic battery must be chosen based on component material properties and the desired performance and safety requirements. Generally, an electrical conditioning step, involving at least the first recharge of the battery, is part of the assembly process. Again, the determination of an appropriate conditioning step along with the setting of the battery operating parameters (eg. voltage, current, and temperature limits) would be required of someone familiar with the field.

Other configurations or components are possible for the batteries of the invention. For example, a prismatic format is considered highly desirable and possible. Active electrode assemblies for such formats can be formed by a winding process thus leaving a central region available for installation of similar internal shorting means.

Additionally, alternate methods of construction can be employed. In the examples to follow, one possible empirical procedure initially involved determining the internal resistance of a battery without internal shorting means incorporated first. Then, either dry or wet (but without electrolyte salt) battery assemblies were subjected to the standard crush test with various iterations of internal shorting means incorporated while monitoring the battery assembly resistance. Following this, embodiments were chosen wherein the extrinsic internal short provided by the internal shorting means appeared to be created well before the usual intrinsic internal short, and wherein the extrinsic internal short resistance appeared to rapidly decrease below that of the internal resistance of the battery before the usual intrinsic internal short was even created. Those skilled in the art will appreciate other approaches that are possible for empirically arriving at a suitable battery construction.

Figure 3:
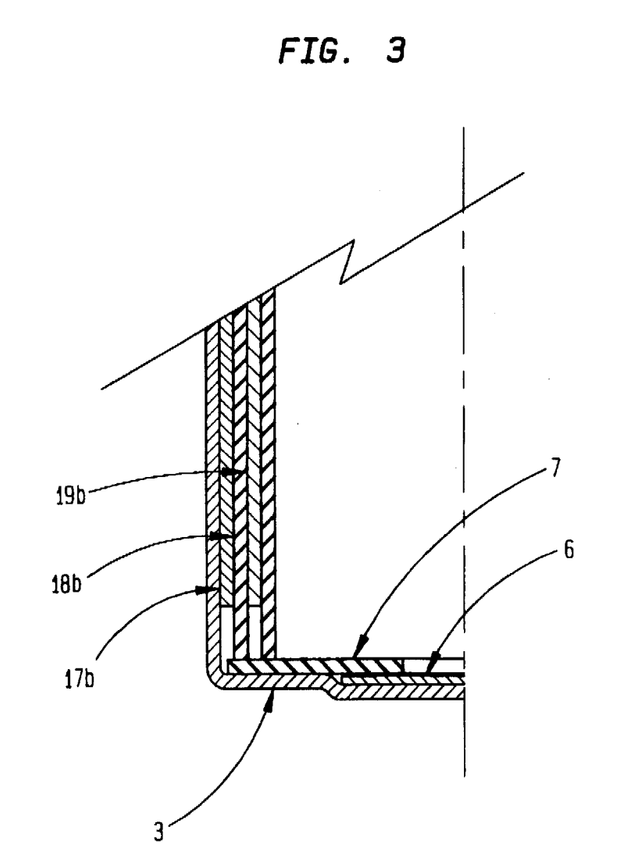
FIG. 3 depicts an alternative construction comprising expanded metal foil that, when incorporated in the battery of FIG. 1, results in an alternative embodiment of the invention.

Other alternative constructions that may be expected to achieve the benefits of the invention include defining regular spiral screw threads on the core 9a rather than a plurality of concentric threads 17a. Or, the internal shorting means can comprise similar puncturing means on the periphery of the active electrode assembly. As shown in FIG. 3, expanded metal foil 17b can serve to puncture an outer separator wrap 18b when deformed under abuse, thereby electrically connecting the container 3 at anode potential to an outermost uncoated cathode surface 19b.

Figure 4:
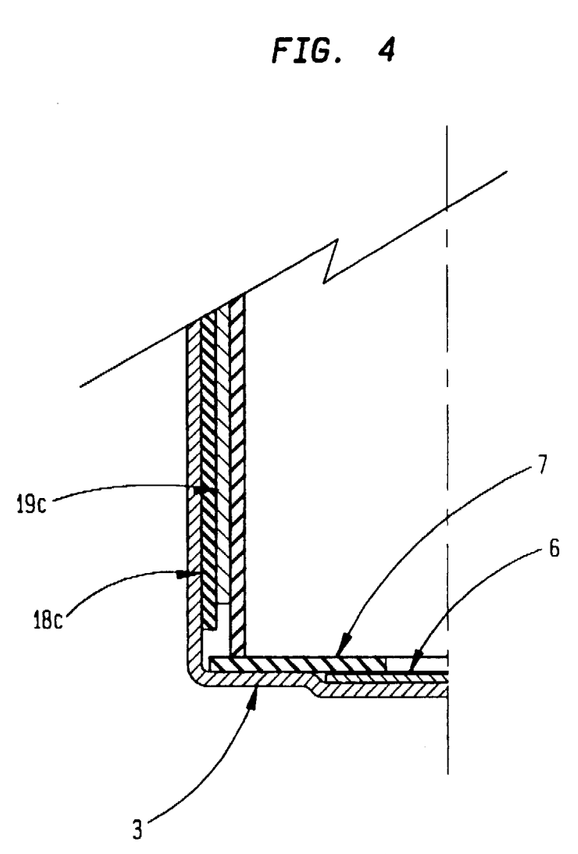
FIG. 4 depicts an alternative construction comprising an outermost separator wrap itself comprising a plurality of macroscopic holes that, when incorporated in the battery of FIG. 1, results in an alternative embodiment of the invention.

Additionally, incorporated puncturing means may not be necessary. The outermost separator wrap may comprise a plurality of macroscopic holes (greater than 1μ in size) such that an undeformed container would not contact an outer wrapped electrode yet would do so if deformed sufficiently. A possible construction is depicted in FIG. 4 wherein the container 3 is again at anode potential and an uncoated cathode surface 19c is adjacent to an outermost separator wrap 18c comprising a plurality of macroscopic holes.

The following examples are provided to further illustrate certain aspects of the invention and to provide data on possible practical embodiments of the invention.

In all the examples, 4/3 A size lithium ion batteries with general constructions similar to that shown in FIG. 1 were used. LiCoO$_2$ powder and mesocarbon microbeads (supplied by Osaka Gas Ltd.) carbon powder graphitized at 2650° C. were used as the active cathode and anode materials respectively. The electrolyte employed was a solution of 1M LiPF$_6$ in propylene carbonate/ethylene carbonate/ diethylcarbonate (20/30/50 ratio by volume). After construction all batteries were initially charged, followed by one more discharge and charge cycle. A four hour, current limited, constant voltage charge method was used to a 4.1 V cutoff. A constant current, 800 mA, discharge method was used to a 2.5 V cutoff. Cycling was done at 21° C.

Batteries were then subjected to a typical industry crush test wherein the battery is mounted on a flat plate (cylindrical axis parallel to the plate) fixed at a specified temperature. A ⅝" diameter round bar, with cylindrical axis perpendicular to the cylindrical axis of the battery, is then brought down using a hydraulic ram onto the centre of the battery and force is applied until the ram/bar assembly reaches a stop. The stop is adjusted such that the gap between the bar and the plate equals a fixed specified percentage of the original battery diameter (usually 25%). The ram speed is roughly constant and is such that the time from point of contact of bar with battery to reaching the stop is about 5 seconds.

COMPARATIVE EXAMPLE

Twenty-nine 4/3 A batteries of conventional construction were fabricated as described earlier, although nine were fabricated without safety disconnect devices installed. The DC resistance of several of the batteries was determined by measuring the instantaneous voltage drop between open circuit and constant current discharge conditions and applying Ohm's law. The internal battery resistance was about 140 m$\Omega$ in each case.

The group of nine fully charged batteries without disconnect devices was subjected to an external short circuit test wherein a 10 m$\Omega$ hard short is applied across the external terminals. The batteries heated up significantly and then the power drain dropped roughly to zero. At this point, it is believed that the internal separator had melted and sealed thereby cutting off the discharge capability of the battery. (The separator melting point is about 155° C. It is expected that the internal temperature of the battery will be somewhat greater than the skin temperature). The pressure relief vent on each battery was activated as a result of this short circuit test, but there was no smoke nor flame generated.

Ten other fully charged batteries were then subjected to the aforementioned crush test at 30° C. temperature and with a gap set at 25% of the original battery diameter. Again the pressure relief vent on each battery was activated, but there was no smoke nor flame.

The remaining ten batteries were subjected to a similar crush test except it was done at 40° C. One of these batteries emitted both visible flame and a significant amount of smoke through the activated pressure relief vent. Three other batteries in this series emitted similar amounts of smoke but no visible flame. The remaining six batteries had activated relief vents but no smoke nor flame.

This example demonstrates that batteries of this type handle external short circuit abuse without incident, but may behave violently under certain conditions of mechanical abuse.

ILLUSTRATIVE EXAMPLES (1) Four 4/3 A battery assemblies were prepared as described in the Comparative example except that the electrolyte solute (LiPF$_6$) was omitted. The batteries were thus inactive electrochemically. These battery assemblies were subjected to a similar crush test (but at room temperature) while accurately measuring the internal resistance of the short created within the battery. (An AC impedance meter was used for these accurate measurements. Consequently, impedance was directly measured and not resistance. Prior to crushing, the measured impedance is dominated by the capacitance of the battery assembly. The actual resistance of the battery assembly is initially greater than 20 M$\Omega$. During crushing, the measured impedance, ie. capacitance, is virtually constant until an internal short develops that dominates the impedance. At that point, the measured impedance is approximately the same as the internal resistance. The resistances mentioned henceforth in this example are thus derived from the measured impedance in this way.) The range of the shorts created was from 30 to 50 m$\Omega$.

(2) Four 4/3 A battery assemblies were then prepared in a similar manner except that the core was replaced with a threaded rod 0.138" in diameter and 0.031" pitch. The threaded rod was connected electrically via spot weld to the container. Two layers of separator from the active electrode winding assembly separated the threaded rod from uncoated cathode substrate. Again the battery assemblies were subjected to a similar crush test. The range of the shorts created was from 22 to 36 m$\Omega$.

(3) Four other 4/3 A battery assemblies were prepared in a similar manner to the immediately preceding assemblies except that the core was replaced with a 0.125" OD, solid core with about 27 concentric threads, equally spaced over a 1" central length. The tips of the threads were machined to define sharp 60° C. angles. Again, the battery assemblies were subjected to a similar crush test while monitoring the internal resistance. The range of shorts created was from 4 to 5 m$\Omega$.

Figure 5:
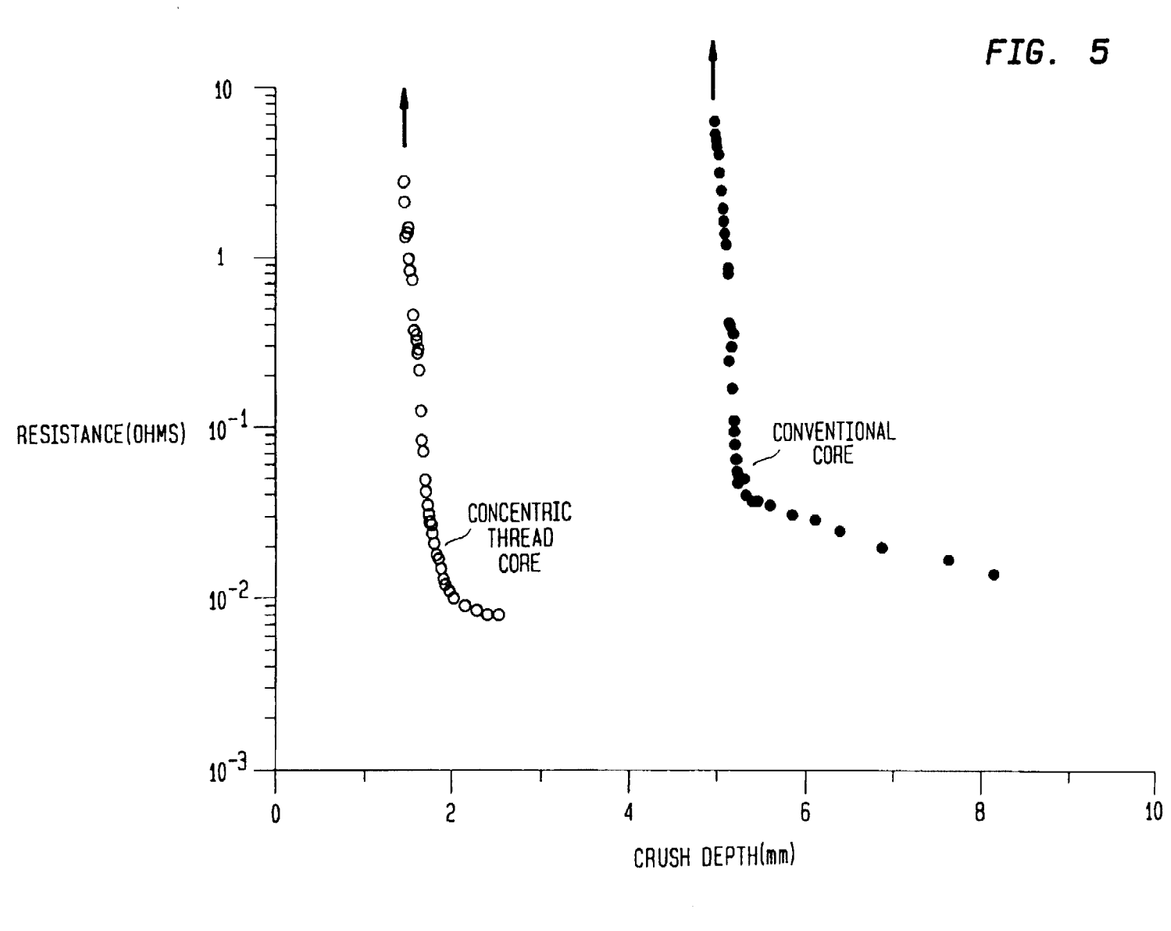
FIG. 5 depicts a plot of internal short resistance of both a representative battery assembly of the invention comprising a concentric thread core and that of a representative battery assembly comprising a conventional core versus depth of crush.

FIG. 5 shows a plot of internal short resistance (derived from impedance measurements) of a representative battery assembly with concentric thread core along with that of a representative battery assembly with conventional core versus depth of crush (defined as vertical distance travelled by rod after point of contact with battery). As indicated in FIG. 5, the battery assembly with concentric thread core develops an internal short earlier than the conventional battery assembly. Said internal short also reaches a stable final value relatively quickly (as a function of crush depth) that is well below the internal resistance of an actual battery.

(4) Finally, three 4/3 A battery assemblies were prepared as described in the Comparative example except that the assembly was completely dry and the outer electrode winding assembly was wrapped with a 0.0025" thick Kapton (trademark of Dupont) tape comprising a plurality of 0.090" diameter microscopic holes. The holes were arranged in a square array, the distance between holes being about 0.16". Additionally, the winding assembly was fabricated such that the outermost electrode surface of the winding assembly was uncoated cathode substrate adjacent to the Kapton (trademark) tape. Thus there was a clear line of sight through said holes from the battery container to the uncoated cathode substrate. Again these assemblies were subjected to a similar crush test, but with a gap set at 75% of the original battery assembly diameter for two of the assemblies and at 25% for one assembly. The range of shorts created was from 7 to 0.5 m$\Omega$.

These examples illustrate a variety of constructions that result in internal shorts with reduced resistance over conventional constructions in simulated batteries. Assuming that the principle of superposition holds, additional shorting region or regions are created as a result of the modifications. Also, in the case of the concentric thread design, it would then follow that the resistance of the additional shorting region or regions reaches a final minimum value, below the internal resistance of an actual battery, before intrinsic shorting occurs in the battery.

INVENTIVE EXAMPLE

Nineteen batteries were constructed and cycled as described in the Comparative example that additionally incorporated the concentric thread core construction described in the four Illustrative examples.

Ten fully charged batteries were crushed @ 30° C. and with a gap set at 25% of the original battery diameter. The pressure relief vent was activated on each battery, but there was no smoke nor flame.

The nine other fully charged batteries were crushed @ 40° C. and with a similar gap. In each case, the pressure relief vent was activated and a wisp of smoke was emitted from the vent. There was no significant smoke generation nor flame.

This example demonstrates a statistical improvement in safety for the 40° C. crush test behaviour for batteries of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A battery having an internal resistance comprising:
   (a) a container;
   (b) an active electrode assembly comprising a cathode electrode, an anode electrode and a separator, wherein an intrinsic internal short is created by the physical contact of the cathode electrode with the anode electrode upon application of increasing non-uniform pressure to said container, the net resistance of the intrinsic internal short decreasing as said applied non-uniform pressure is increased; and
   (c) internal shorting means inside the container and geometrically configured with respect to the container and the active electrode assembly such that an extrinsic internal short is created by the physical contact of two battery components at opposite potential, wherein at most one component is an electrode of said cathode electrode and said anode electrode, upon application of increasing non-uniform pressure to said container.

2. A battery as claimed in claim 1 wherein the extrinsic internal short is created before the net resistance of the intrinsic internal short equals the internal resistance of the battery.

3. A battery as claimed in claim 2 wherein the extrinsic internal short is created before the intrinsic internal short.

4. A battery as claimed in claim 3 wherein the extrinsic internal short resistance is less than the internal resistance of the battery before the intrinsic internal short is created.

5. A battery as claimed in claim 1 wherein the internal shorting means comprises a core central to the active electrode assembly, the core further comprising puncturing means.

6. A battery as claimed in claim 5 wherein the puncturing means comprises a screw thread on the outer surface of said core.

7. A battery as claimed in claim 5 wherein the puncturing means comprises at least one concentric thread on the outer surface of said core.

8. A battery as claimed in claim 5 wherein the core is at one battery potential and is adjacent to a central separator section, the central separator section in turn being adjacent to an electrode at the opposite battery potential.

9. A battery as claimed in claim 1 wherein the internal shorting means is peripheral to the active electrode assembly.

10. A battery as claimed in claim 9 wherein the internal shorting means comprises puncturing means.

11. A battery as claimed in claim 10 wherein the puncturing means comprises a section of expanded metal located between the container at one battery potential and an outer separator section, the outer separator section being adjacent to an electrode at the opposite battery potential.

12. A battery as claimed in claim 9 wherein an outer separator section is located between the container at one battery potential and an electrode at the opposite battery potential, the outer separator section comprising a plurality of macroscopic holes.

13. A battery as claimed in claim 1, 5, or 9 wherein the battery is cylindrically shaped.

14. A battery as claimed in claim 1, 5, or 9 wherein the battery comprises a lithium transition metal oxide cathode, an electrolyte comprising a lithium salt dissolved in non-aqueous solvents, and a carbonaceous anode.

15. A battery as claimed in claim 1, 5, or 9 wherein the battery comprises a lithium cobalt oxide cathode, an electrolyte comprising lithium hexafluorophosphate dissolved in a mixture of propylene carbonate, ethylene carbonate, and diethyl carbonate solvents, and a graphitized carbonaceous anode.

16. A battery as claimed in claim 1, 5, or 9 wherein the non-uniform pressure results from crushing the battery with a round bar.

17. A method of making a battery benign to mechanical abuse comprising:
   (a) preparing the battery for assembly, the battery after assembly having an internal resistance and a construction comprising a container, an active electrode assembly comprising a cathode electrode, an anode electrode and a separator, wherein after assembly an intrinsic internal short is created by the physical contact of said cathode electrode with said anode electrode upon application of increasing non-uniform pressure to said container, the net resistance of the intrinsic internal short decreasing as said applied non-uniform pressure is increased;
   (b) installing an internal shorting means inside the container and geometrically configured with respect to the container and the active electrode assembly such that an extrinsic internal short is created by the physical contact of two battery components at opposite potential, wherein at most one component is an electrode of said cathode electrode and said anode electrode, upon application of increasing non-uniform pressure to said container; and
   (c) assembling the battery.

18. A method as claimed in claim 17 wherein the installation is such that the extrinsic internal short is created before the net resistance of the intrinsic internal short equals the internal resistance of the battery.

19. A method as claimed in claim 18 wherein the installation is such that the extrinsic internal short is created before the intrinsic internal short.

20. A method as claimed in claim 19 wherein the installation is such that the extrinsic internal short resistance is less than the internal resistance of the battery before the intrinsic internal short is created.

21. A method as claimed in claim 17 wherein the installation comprises placing a core central to the active electrode assembly and providing said core with puncturing means.

22. A method as claimed in claim 21 wherein the installation comprises connecting the core to one battery potential and placing said core adjacent to a central separator section, the central separator section in turn being adjacent to an electrode at the opposite battery potential.

23. A method as claimed in claim 17 wherein the installation comprises locating the internal shorting means peripheral to the active electrode assembly.

24. A method as claimed in claim 23 wherein the installation further comprises providing said internal shorting means with puncturing means.

25. A method as claimed in claim 23 wherein the installation comprises locating an outer separator section between the container at one battery potential and an electrode at the opposite battery potential, the outer separator section comprising a plurality of macroscopic holes.

26. A method as claimed in claim 17, 21, or 23 wherein the battery is cylindrically shaped.

27. A method as claimed in claim 17, 21, or 23 wherein the battery comprises a lithium transition metal oxide cathode, an electrolyte comprising a lithium salt dissolved in non-aqueous solvents, and a carbonaceous anode.

28. A method as claimed in claim 17, 21, or 23 wherein the battery comprises a lithium cobalt oxide cathode, an electrolyte comprising lithium hexafluorophosphate dissolved in a mixture of propylene carbonate, ethylene carbonate, and diethyl carbonate solvents, and a graphitized carbonaceous anode.

29. A method as claimed in claim 17, 21, or 23 wherein the non-uniform pressure results from crushing the battery with a round bar.

* * * * *

UNITED STATES PATENT AND TRADEMARK OFFICE
CERTIFICATE OF CORRECTION

PATENT NO. : 5,747,188
DATED : May 5, 1998
INVENTOR(S) : Von Sacken *et al.*

It is certified that error appears in the above-indentified patent and that said Letters Patent is hereby corrected as shown below:

Column 5, line 19, "exists inherent an" should read --exists an inherent --.

Signed and Sealed this

Eighteenth Day of August, 1998

Attest:

BRUCE LEHMAN

*Attesting Officer*       *Commissioner of Patents and Trademarks*